(12) United States Patent
Bagley (10) Patent No.: US 10,105,014 B2
(45) Date of Patent: Oct. 23, 2018

(54) COLLAPSIBLE FOOD KEEPER

(71) Applicant: Progressive International Corporation, Kent, WA (US)

(72) Inventor: Justin Bagley, Kent, WA (US)

(73) Assignee: PROGRESSIVE INTERNATIONAL CORPORATION, Kent, WA (US)

( * ) Notice: Subject to any disclaimer, the term of this patent is extended or adjusted under 35 U.S.C. 154(b) by 0 days.

(21) Appl. No.: 15/902,836

(22) Filed: Feb. 22, 2018

(65) Prior Publication Data

US 2018/0177344 A1    Jun. 28, 2018

Related U.S. Application Data

(63) Continuation-in-part of application No. 14/613,873, filed on Feb. 4, 2015, now Pat. No. 9,975,661.

(60) Provisional application No. 61/935,745, filed on Feb. 4, 2014.

(51) Int. Cl.
| | |
|---|---|
| B65D 21/00 | (2006.01) |
| A47J 47/10 | (2006.01) |
| B65D 21/08 | (2006.01) |
| B65D 43/02 | (2006.01) |

(52) U.S. Cl.
CPC ............ *A47J 47/10* (2013.01); *B65D 21/086* (2013.01); *B65D 43/0208* (2013.01); *B65D 2543/00194* (2013.01); *B65D 2543/00296* (2013.01)

(58) Field of Classification Search
CPC .. B65D 21/086; B65D 85/50; B65D 43/0208; B65D 2543/00296; B65D 2543/00194; B65D 21/068; B65D 85/1036; B65D 5/0085; B65D 5/5253; A47J 47/10; A47J 47/08

USPC ............................................. 220/8, 571, 501
See application file for complete search history.

(56) References Cited

U.S. PATENT DOCUMENTS

| | | | | | |
|---|---|---|---|---|---|
| 294,217 | A | * | 2/1884 | Foos | B65D 21/086 220/8 |
| 313,538 | A | * | 3/1885 | Schneider | B65D 21/086 220/8 |
| 491,865 | A | * | 2/1893 | Wynn | B65D 21/086 220/8 |
| 685,736 | A | * | 10/1901 | Atwell | B65D 21/086 206/550 |
| 699,462 | A | * | 5/1902 | Ehile | B65D 21/086 206/503 |
| 844,955 | A | * | 2/1907 | Morgan | B65D 21/086 119/474 |
| 848,698 | A | * | 4/1907 | Smith | B65D 21/083 220/4.03 |
| 888,554 | A | * | 5/1908 | Tuttle | B65D 21/086 206/546 |
| 888,943 | A | * | 5/1908 | Tuttle | B65D 21/086 206/546 |
| 932,806 | A | * | 8/1909 | Paulson | B65D 21/086 220/8 |

(Continued)

*Primary Examiner* — Ernesto Grano
(74) *Attorney, Agent, or Firm* — Lowe Graham Jones PLLC (57) ABSTRACT

A collapsible food keeper is selectively positionable between an expanded position and a collapsed position, in which the food keeper may be used to contain food items such as eggs in both positions. In one version, an upper container portion is telescopically connected to a lower container portion, with a lid removably attached to the upper container and a base removably attached to the lower container.

19 Claims, 13 Drawing Sheets

(56) References Cited

U.S. PATENT DOCUMENTS

| | | | | |
|---|---|---|---|---|
| 1,482,425 A | * | 2/1924 | Ziony | A45F 3/20 220/8 |
| 1,863,793 A | * | 6/1932 | Hermani | A47G 19/26 220/324 |
| 3,301,457 A | * | 1/1967 | Millian | B65D 21/086 220/266 |
| 3,329,298 A | * | 7/1967 | Demas | B65D 21/086 220/8 |
| 3,338,388 A | * | 8/1967 | Igoe | B65D 5/68 206/8 |
| 3,578,415 A | * | 5/1971 | Hiltz | B01J 7/00 220/739 |
| 4,624,382 A | * | 11/1986 | Tontarelli | A45C 5/045 220/751 |
| 4,724,976 A | * | 2/1988 | Lee | B65D 21/086 220/8 |
| 5,474,195 A | * | 12/1995 | Pai | B62J 9/00 220/4.26 |
| 5,575,398 A | * | 11/1996 | Robbins, III | A47G 23/0241 215/354 |
| 5,579,940 A | * | 12/1996 | Weiss | A45C 7/0031 132/287 |
| 5,715,962 A | * | 2/1998 | McDonnell | B65D 21/086 220/4.03 |
| 6,135,307 A | * | 10/2000 | Fahy | A47G 19/02 220/521 |
| 6,276,555 B1 | * | 8/2001 | Edwards | A47J 43/24 220/23.86 |
| 6,551,284 B1 | * | 4/2003 | Greenberg | A61M 25/02 604/174 |
| 6,588,616 B1 | * | 7/2003 | Ho | B02C 18/0007 220/4.03 |
| 6,908,004 B2 | * | 6/2005 | Barr | B65D 21/086 220/4.03 |
| 7,487,881 B2 | * | 2/2009 | Watzke | B65D 1/24 220/501 |
| D613,122 S | * | 4/2010 | Curtin | A47J 47/10 D7/629 |
| 8,007,016 B2 | * | 8/2011 | Mantyla | B01D 17/0208 220/4.03 |
| 8,240,503 B2 | * | 8/2012 | Curtin | A47J 47/10 220/501 |
| 9,119,507 B2 | * | 9/2015 | Abrams | A47J 41/0022 |
| 9,504,340 B2 | * | 11/2016 | Starr | A47J 47/00 |
| 2003/0183628 A1 | * | 10/2003 | Barr | B65D 21/086 220/8 |
| 2007/0241104 A1 | * | 10/2007 | Huizingh | B65D 21/086 220/8 |
| 2010/0308042 A1 | * | 12/2010 | Faris | B65D 11/02 220/8 |
| 2013/0032591 A1 | * | 2/2013 | Moran | A45C 7/0036 220/8 |
| 2015/0136786 A1 | * | 5/2015 | Lonner | B65D 45/16 220/529 |
| 2015/0251808 A1 | * | 9/2015 | Tsui | A45F 3/20 220/8 |
| 2015/0251809 A1 | * | 9/2015 | Jasin | F41H 3/00 220/8 |
| 2016/0045076 A1 | * | 2/2016 | de Groote | A47J 47/02 220/212 |
| 2016/0059990 A1 | * | 3/2016 | Patikas-Bryant | B65D 21/086 220/523 |

* cited by examiner

COLLAPSIBLE FOOD KEEPER

PRIORITY CLAIM

This application is a continuation in part of U.S. application Ser. No. 14/613,873, filed Feb. 4, 2016, which claims the benefit of U.S. provisional application Ser. No. 61/935,745 filed Feb. 4, 2014; the contents of each of which are incorporated by reference.

FIELD OF THE INVENTION

This invention relates generally to containers for storing food items.

BACKGROUND OF THE INVENTION

Containers for storing produce or other food items are useful, but such containers are often either too large or too small for the volume of produce to be stored. In the case of containers that are too large, they consume too much space both in a refrigerator when used and in a storage cabinet between uses. Containers or bowls that are collapsible are typically collapsible in a manner that makes them unsuitable for use when in the collapsed position, and as a result the ability to collapse is only an advantage during storage.

SUMMARY OF THE INVENTION

A preferred collapsible produce keeper is selectively positionable between an expanded position and a collapsed position, in which the produce keeper may be used to contain produce in both positions.

The preferred version of the collapsible produce container includes an upper container telescopically connected to a lower container, with a lid removably attached to the upper container and a base removably attached to the lower container.

In one version, the perimeter of the upper container is slightly larger than that of the lower container such that the lower container can fit within the upper container. In a preferred example, each of the upper container and lower container is shaped as a rectangle with rounded corners when viewed from the top.

The lower portion of the upper container may be inclined inward somewhat, and the upper portion of the lower container may be inclined outward somewhat, so that the fit between the two sections is increasingly snug as the two sections move from the collapsed to the expanded position. Most preferably, the inclines cooperate to produce a snug fit in the expanded position that is sufficiently tight to retain the upper container in the expanded position.

The collapsible keeper may be used with other food items as well, and may in some versions be tailored for use with specific food items. One such example is a collapsible food carrier configured for use with carrying deviled eggs.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
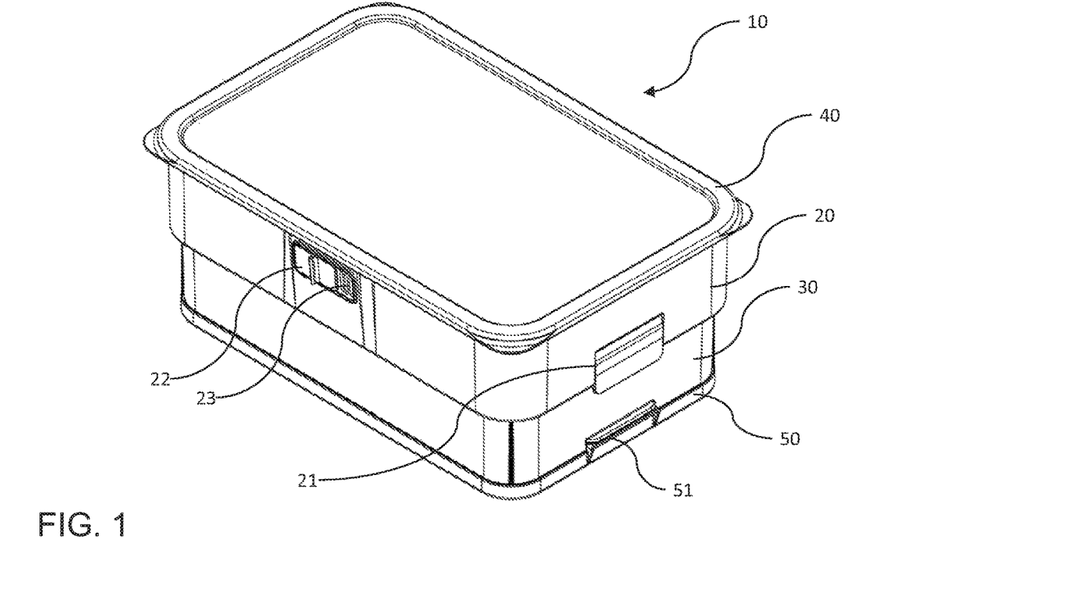
FIG. 1 is a top perspective view of a preferred collapsible produce keeper, shown in an expanded position.
Figure 2:
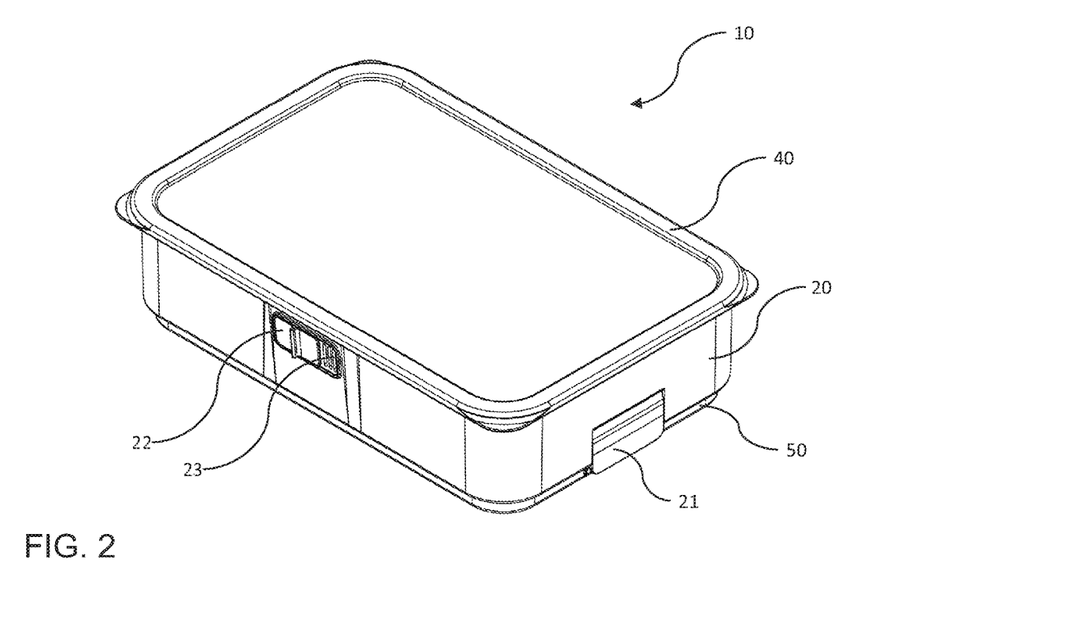
FIG. 2 is a top perspective view of a preferred collapsible produce keeper, shown in a collapsed position.
Figure 3:
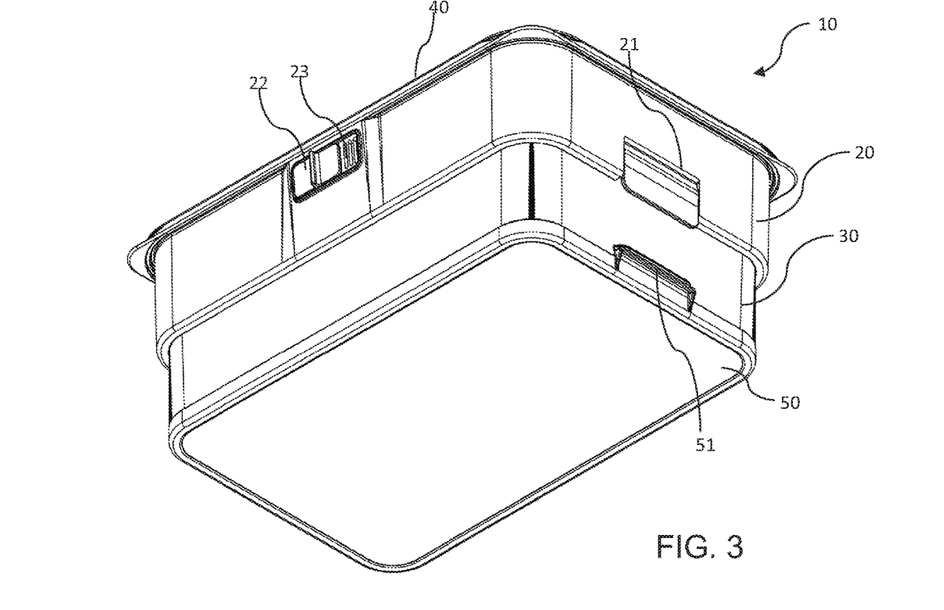
FIG. 3 is a bottom perspective view of a preferred collapsible produce keeper, shown in an expanded position.
Figure 4:
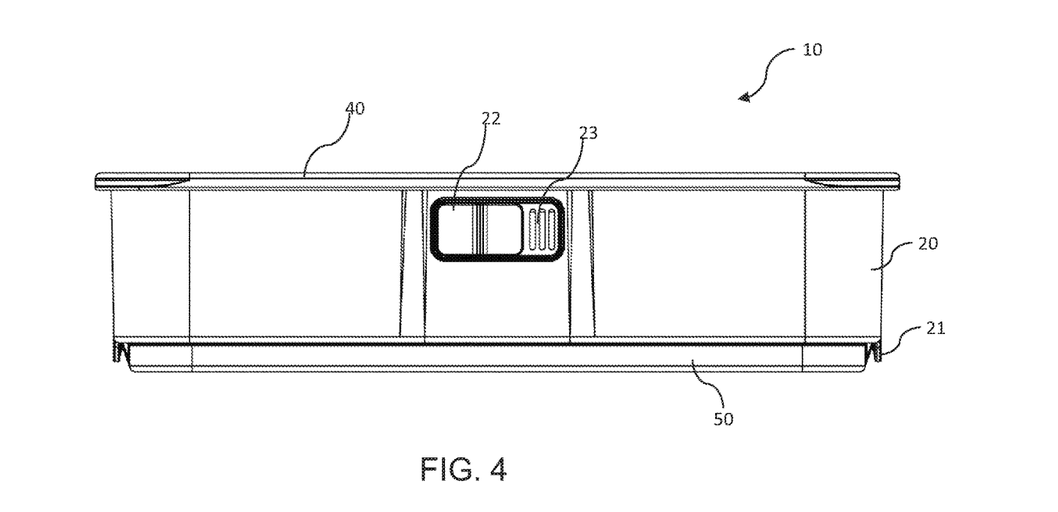
FIG. 4 is a front plan view of a preferred collapsible produce keeper, shown in a collapsed position.
Figure 5:
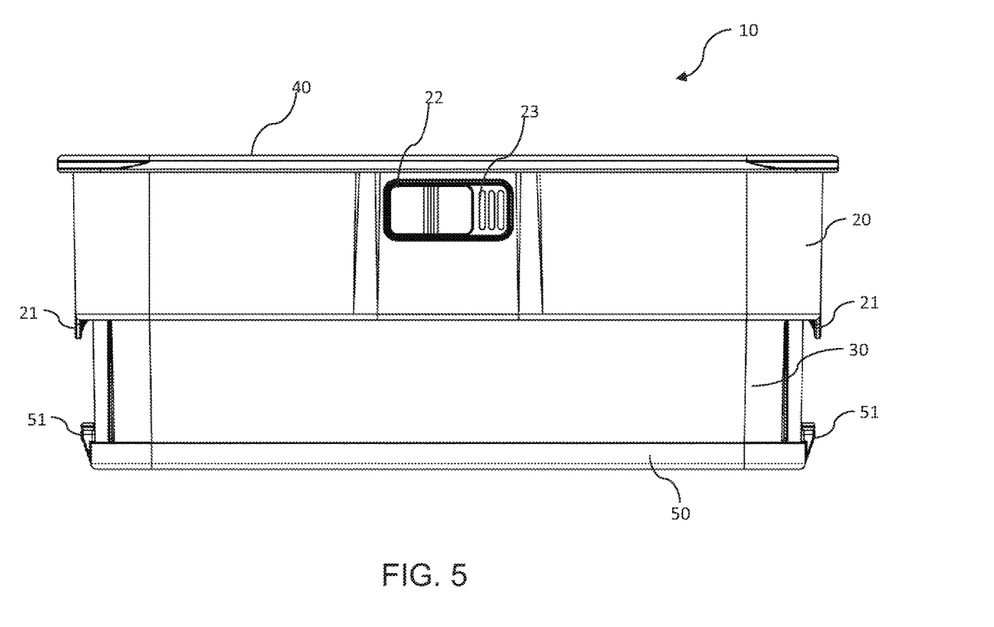
FIG. 5 is a front plan view of a preferred collapsible produce keeper, shown in an expanded position.

With reference to the accompanying figures the present invention is a collapsible food keeper or carrier 10 which is selectively positionable between an expanded position such as shown in FIG. 1 and a collapsed position such as shown in FIG. 2. In the version as illustrated in FIGS. 1-13, the collapsible food keeper is particularly well suited for storing produce. In the version as illustrated in FIGS. 14-18, the collapsible food keeper is useful for other food items, especially for carrying and storing deviled eggs.

The preferred version of the collapsible produce container includes an upper container 20 telescopically connected to a lower container 30, with a lid 40 removably attached to the upper container 20 and a base 50 removably attached to the lower container 30.

In one example of the invention, the upper container 20 and lower container 30 are each constructed from polypropylene or a similar material to produce a generally rigid container. Any materials may be used to form the upper and lower containers, although in accordance with preferred aspects of the invention, the upper and lower containers are each formed from material that is at least semi-rigid or rigid. The lid 40 and base 50 may also be formed from polypropylene, although in other versions of the invention they may be formed from materials that differ from that used for the container.

The upper and lower containers are sized and configured to be telescopic with respect to one another. In the illustrated version, the perimeter of the upper container is slightly larger than that of the lower container such that the lower container can fit within the upper container. As illustrated, each of the upper container and lower container is shaped as a rectangle with rounded corners when viewed from the top, although other shapes are also possible.

Figure 6:
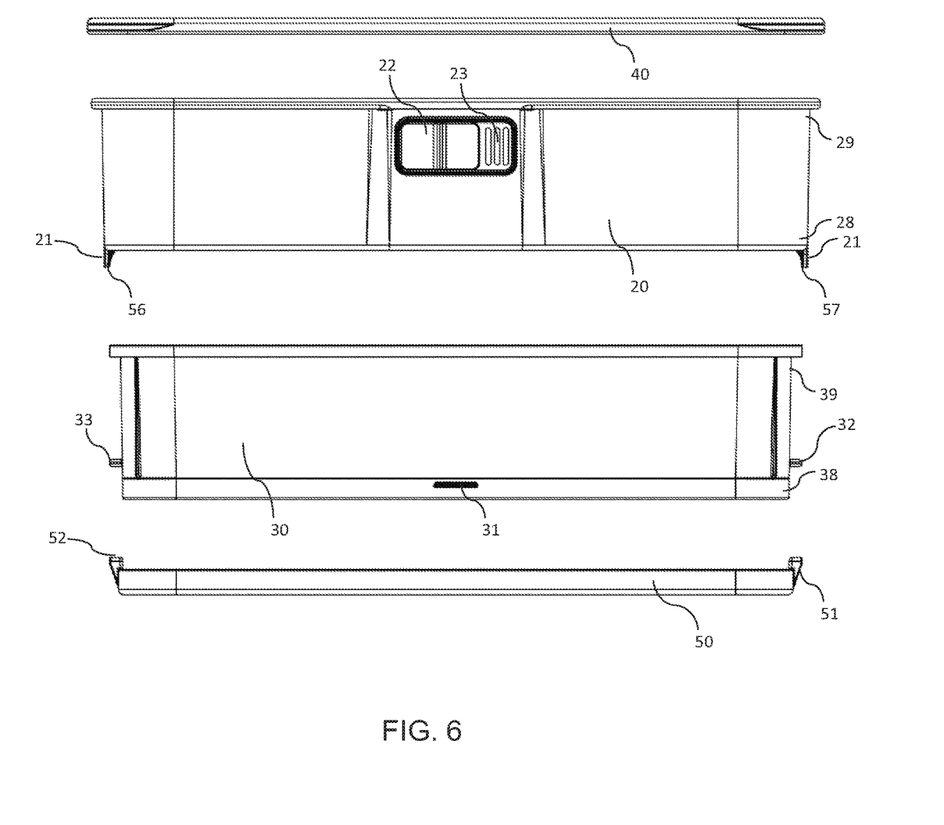
FIG. 6 is a front plan exploded view of a preferred collapsible produce keeper.

As shown in FIG. 6, the sidewalls of the upper container 20 may be inclined inward somewhat (that is, having a larger circumference at the lower portion 28 than the circumference of the upper portion 29), and/or the sidewalls of the lower container may be inclined outward somewhat (that is, having a larger circumference at the upper portion 39 than the lower portion 38), so that the fit between the two sections is increasingly snug as the two sections move from the collapsed to the expanded position. Most preferably, the inclines cooperate to produce a snug fit in the expanded position that is sufficiently tight to retain the upper container in the expanded position as a result of the frictional force.

Figure 7:
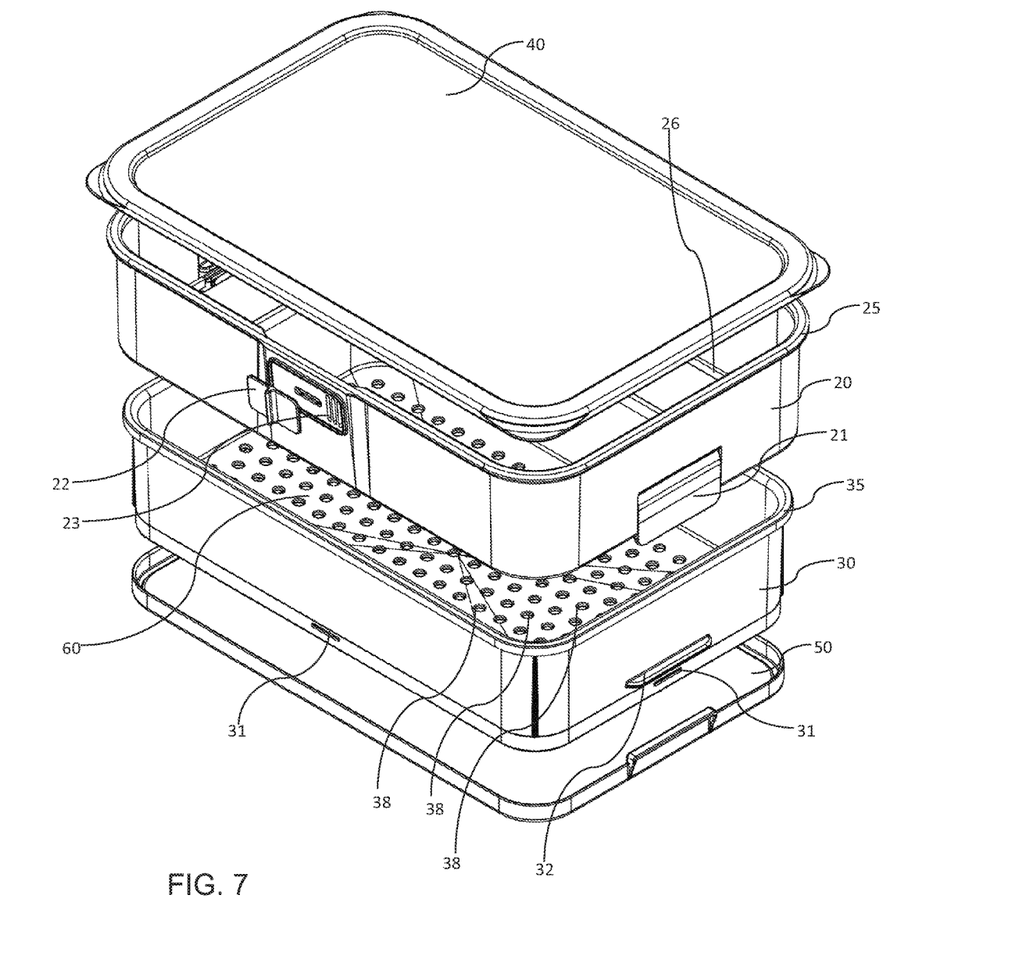
FIG. 7 is a top perspective exploded view of a preferred collapsible produce keeper.
Figure 8:
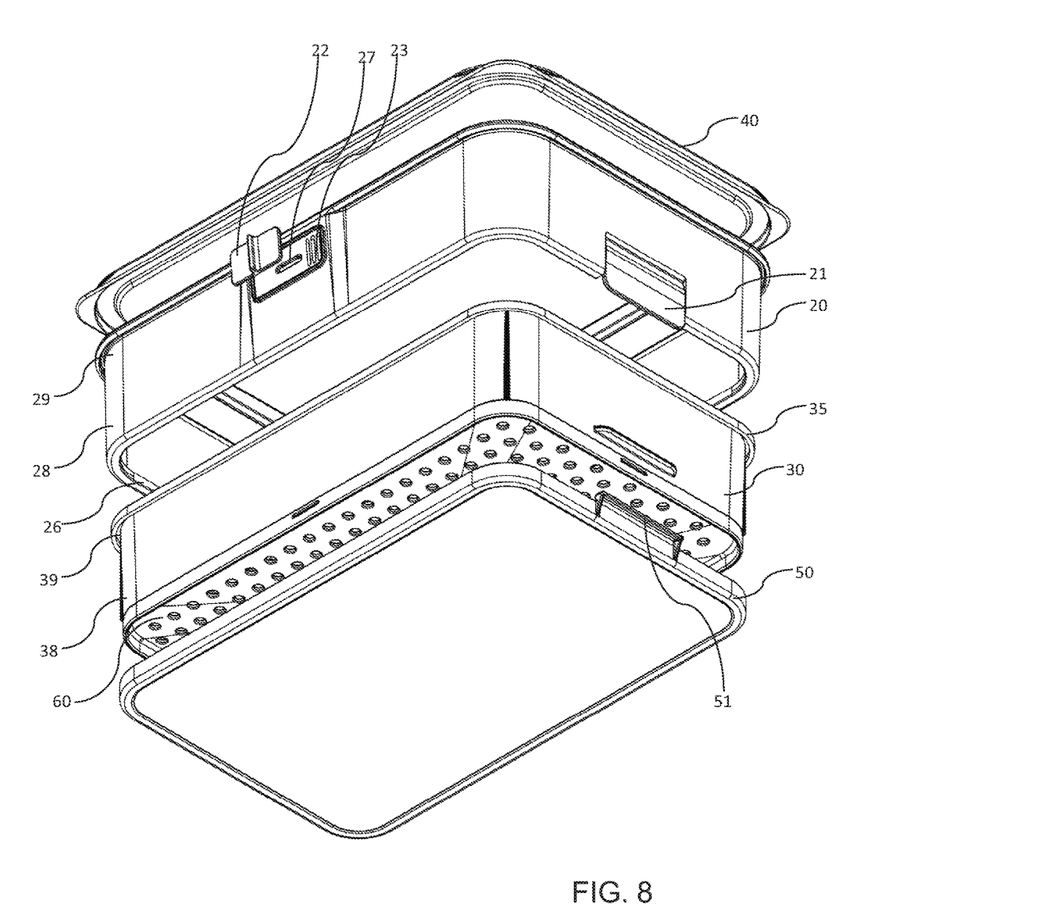
FIG. 8 is a bottom perspective exploded view of a preferred collapsible produce keeper.

The upper container 20 is formed as a continuous vertical sidewall having an open top and an open bottom, as best seen in the exploded views of FIGS. 7 and 8. The lid 40 is removably attachable to the upper container as desired in order to seal the top of the upper container. In the illustrated example, the upper container includes a rim 25 sized and shaped to fit within a peripheral channel formed within the lid 40 to provide a friction fit to secure the lid to the upper container.

The bottom end 28 of the upper container 20 is formed with an inwardly directed flange 26 (see FIG. 8) that extends around all or substantially all of the inner lower perimeter of the upper container. The lower container 30 includes an upper rim 35 having an outwardly directed peripheral flange which is complementary to the inwardly directed flange 26 on the upper container. The flange of the lower container 35 is formed to have a perimeter larger than that of the upper container flange 26. Accordingly, when the lower container is received within the upper container, the upper container is prevented from sliding upward beyond the point at which the two flanges 26, 35 are in contact with one another.

The upper container further includes one or more latches 21, and in the illustrated version a pair of latches is provided, with one on each of two opposing sidewalls, as seen in FIG. 6. The latches may be pivotally attached to the upper container 20 in one version of the invention, or alternatively they may be fixed in position but formed from a material having a degree resiliency allowing the latches to the pulled at least partly outwardly in order to attach and detach the latches.

When the collapsible container is positioned in the collapsed position, each of the latches 21 attaches to a mating surface 51 formed on the base 50. In one example, the latch includes an inwardly facing tab (e.g., 56, 57) which engages and outwardly extending flange (e.g., 32, 33) formed on an outer surface of the sidewalls of the lower container 30. Thus, in one version the latch on the upper container engages the flange on the lower container to hold the collapsible container in the collapsed position.

In another example, the base 50 includes a similar flange (e.g., 51, 52) extending outwardly in a location beneath the latch. The base flange may, in one version of the invention, be positioned on an upwardly extending post which overlaps at least a portion of the outer sidewalls of the lower container 30. The latch may therefore engage the outwardly extending flange formed on the base to maintain the container in the collapsed position, with the upper container positioned adjacent the base.

In the illustrated version, both the lower container 30 and the base 50 include an outwardly directed flange, with each of the outwardly directed flanges being positioned to abut one another when the base is attached to the lower container. In accordance with the illustrated version, the latch formed on the upper container surrounds both the flange formed on the lower container and the flange formed on the base in order to lock the upper container, lower container, and base together.

In yet other versions of the invention, the latching configuration may be varied, for example by reversing the orientation of the latches and the flanges on the various components. Likewise, while two latches are shown in the illustrated version of the invention, a different number of latches such as more than two may be used in other versions of the invention.

The base 50 may attach to the lower container 30 in a manner similar to the connection between the lid and the upper container, such as by forming a mating tongue and groove arrangement. In the illustrated version, the base includes a short peripheral upwardly extending sidewall sized and configured to snugly receive the bottom of the lower container. Most preferably, the fit between the base and the lower container is snug enough to form a watertight or substantially watertight seal. In other versions, the enclosure need not be watertight, particularly where the upwardly directed sidewall from the base is tall enough to retain the volume of water expected to pool within the base.

The lower container 30 is formed with vertical sidewalls in a manner similar to that of the upper container 20, and likewise the lower container includes an open top. Thus, in one version both the lower container 30 and the upper container 20 are formed with sidewalls defining an outer perimeter but with an open top and an open bottom.

In one version, the lower container further includes a floor 60 which is preferably someone concave at the center such that the floor 60 is highest where it meets the sidewalls of the container 30 and lowest at a location in the interior. In addition, the floor includes a plurality of through-holes 38 allowing air and water to travel through the floor. The concave shape and holes direct any water that may gather on the floor in a downward direction and through the holes.

The base 50 and the lower container 30 may include one or more complementary locking features 31 such as a shallow tab and slot, tongue and groove, or similar feature. In one example, each of these structures is relatively shallow to provide resistance against separation of the base from the lower container, while at the same time allowing the two components to be separated under a prying force from the user.

A primary intended purpose for the collapsible produce keeper is for the storage of perishable vegetables such as lettuce, herbs, and the like. Consequently, the floor 60 is preferably raised above the lower edge of the lower portion 38 of the sidewalls of the lower container 30, thereby providing a space between the floor and the upper surface of the base 50. The space between the floor and the base, together with the plurality of holes formed in the floor, allow for air circulation around and under the food items stored in the container. In addition, it allows for water to drain from the food items downward toward the floor where the water can travel through the floor and pool in the base, rather than in the floor, in the location where the water does not remain in contact with the food items.

In the illustrated version, the upper container further includes a vent formed with one or more holes 23 and a vent cover 22. Most preferably, the ventilation holes are positioned along an upper end of the upper container 20 in order to allow for air travel in or out of the container. In one example of the invention, the vent cover includes an inward-facing tab that is trained within a slot 27 within the upper container 20 (see FIG. 8), and therefore is attached to the upper container in a manner allowing the vent cover to slide laterally between an open position in which the ventilation holes 23 are exposed to allow air circulation, and a closed position in which the ventilation holes are blocked by the vent cover.

Figure 9:
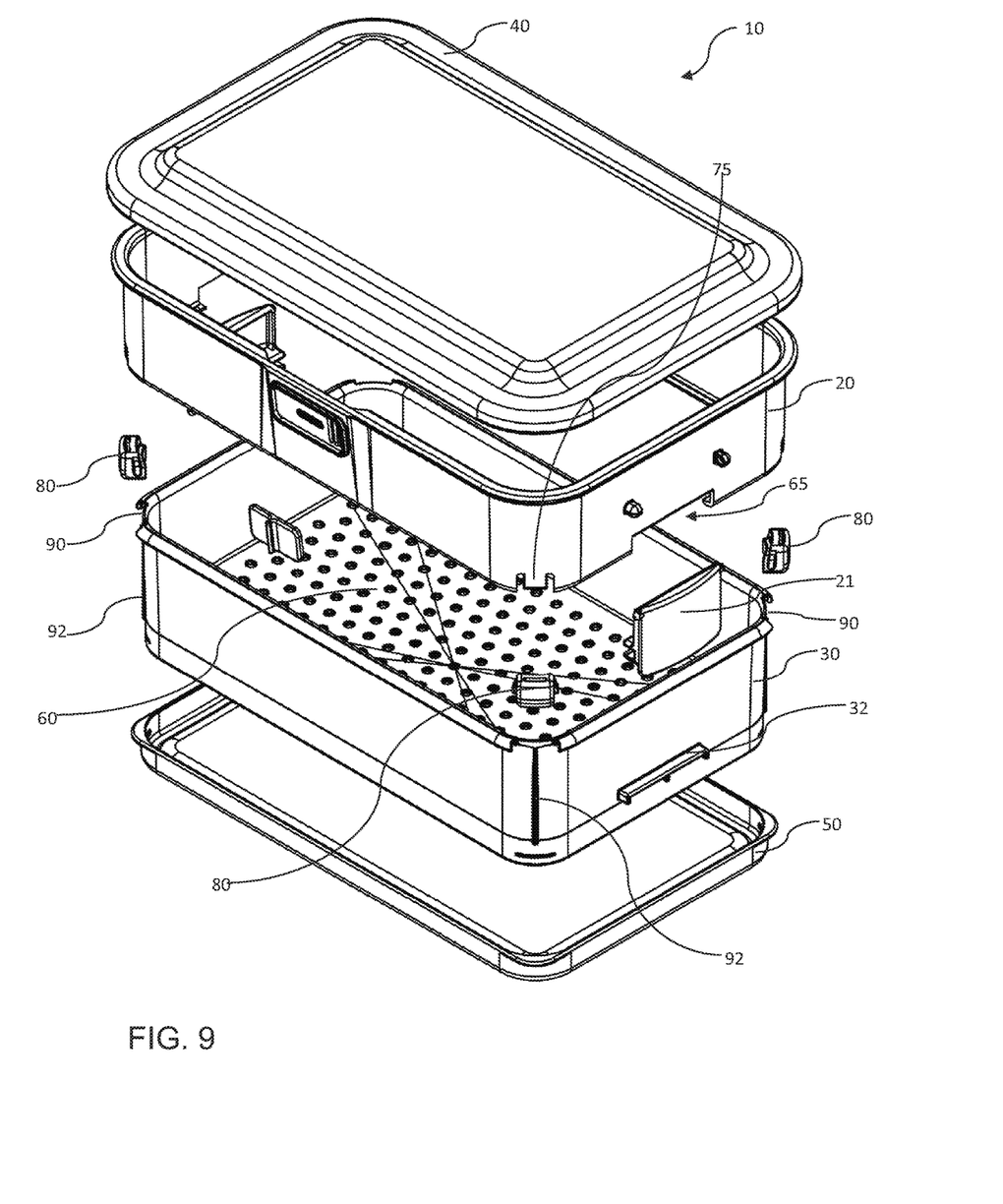
FIG. 9 is a top perspective exploded view of an alternate version of a preferred collapsible produce keeper.
Figure 10:
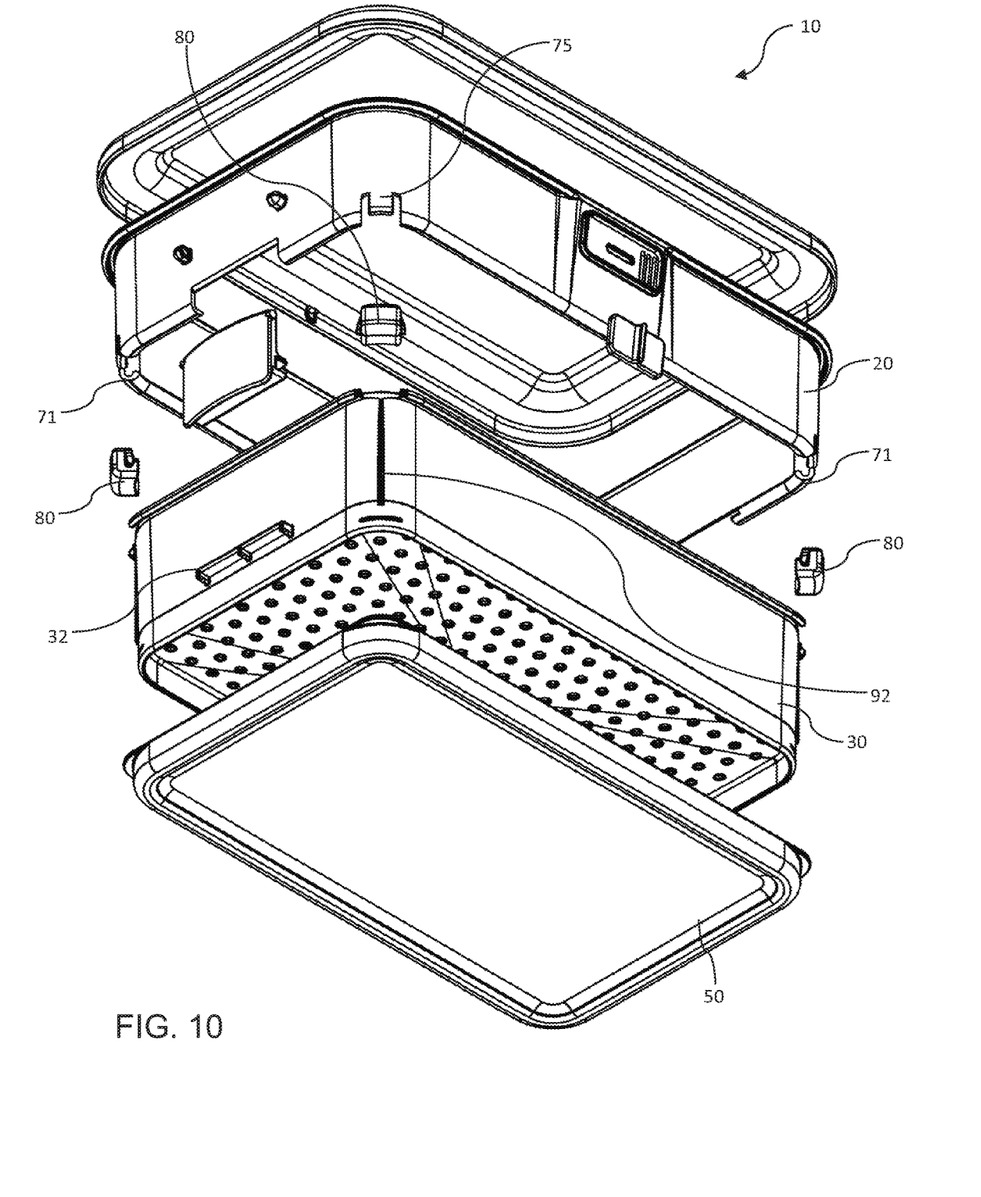
FIG. 10 is a bottom perspective exploded view of an alternate version of a preferred collapsible produce keeper

FIGS. 9 and 10 illustrate an alternate view of a preferred produce keeper. The alternate version includes an upper container 20 and a lower container 30, with a floor 50 and a lid 40. As illustrated, the floor 60 is bowed downwardly so that it is lower at the center than at the location where the floor meets the sidewalls of the lower container.

Figure 11:
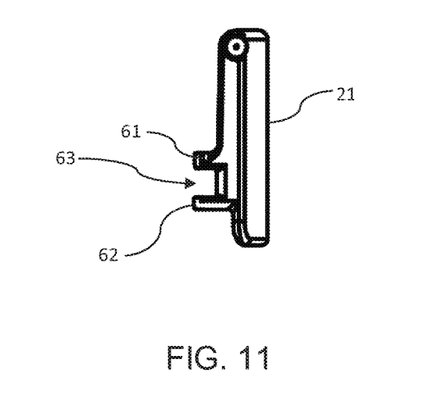
FIG. 11 is a front plan view of a preferred latch for use with a collapsible produce keeper.
Figure 12:
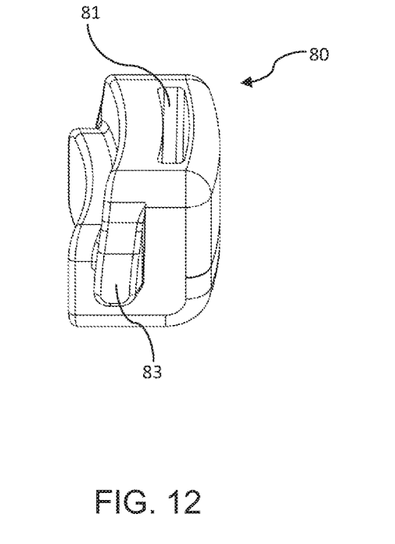
FIG. 12 is a top perspective view of a preferred foot for use with a collapsible produce keeper.
Figure 13:
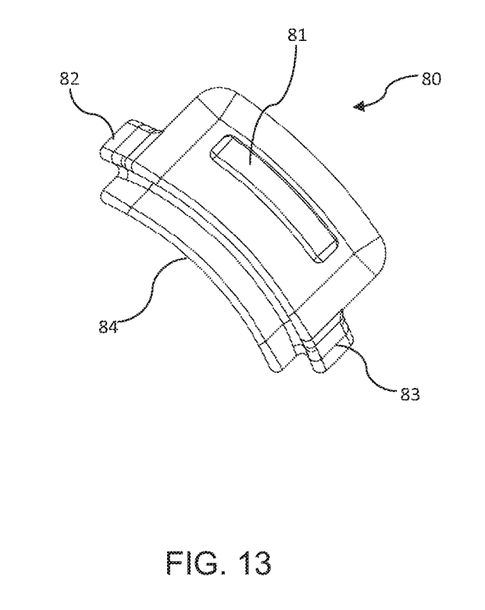
FIG. 13 is a top plan view of a preferred foot for use with a collapsible produce keeper.

A latch 21 for use in the alternate version is illustrated in FIGS. 9 and 10, and also in a front view in FIG. 11. The latch attaches to the upper container for pivotal movement to lock and unlock the two container portions together in a collapsed position. The latch includes a pair of inward-facing tabs 61, 62 extending inward toward the container and forming a channel 63 between them. The flange 32 formed on the lower container is snugly received within the channel to hold the latch to the flange. Likewise, the connection holds the upper container in position collapsed down to the lower container. A cutout 65 is formed at a bottom portion of the sidewall of the upper container to receive the pair of tabs 61, 62 when the latch is unlocked and the upper container is in the expanded position.

In one version of the invention, a resilient foot 80 is positioned at the bottom of each corner of the upper container 20. Thus, as illustrated, four feet 80 are provided. The feet are best seen in FIGS. 9 and 10, and separately shown in FIGS. 12 and 13. In one version, the foot 80 is formed with an arcuate inner face 84 that, when mounted, is directed toward the interior of the upper container 20. Each side of the inner face 84 includes a wing 82, 83 extending laterally away from the inner face. Most preferably, the inner face is not in the same plane as the wings 82, 83, so that it is positioned farther toward the interior of the upper container 20 when attached to the container. A top surface of the foot includes a cavity 81 configured to receive a tab as described below.

At each of the bottom corners of the upper container 20, a tab 75 is positioned adjacent a pair of slots. The tab 75 is sized to be received within the cavity 81 to secure the foot to the tab. The lower sidewalls of the upper container further terminate in an in-turned channel 71 adjacent the tab, with a channel portion extending on either side of the tab. The channel 71 is sized to receive a corresponding one of the wings 82, 83, so that the combination of the wings within the channel and the tab within the cavity will hold the foot in place at the lower corner of the upper container.

The lower container preferably includes a vertical rib 92 positioned at each of the four corners. The rib 92 is positioned so that the arcuate inner face of the foot rides against the rib to aid in frictionally holding the upper container in a particular vertical position with respect to the lower container. The foot is preferably formed from a resilient material, and in one version it is formed from silicone. The resilient nature of the foot improves the frictional engagement of the foot against the rib and outer sidewall of the lower container, which is preferably formed from a rigid plastic material.

In use, a desired amount of food items such as lettuce or herbs is placed within the container, which may be either in the collapsed or expanded position as necessary depending on the volume of food items placed in the container. The base and lid are each positioned on the container to enclose the container, with the vent cover positioned as desired to allow for air circulation.

FIGS. 14-18 illustrate a collapsible food keeper, especially one for storing and carrying deviled eggs. In this version, initially with reference to the exploded view of FIG. 14, the keeper 100 includes an upper container 120, a lower container 130, and a removable lid 140. As with the version described above, the upper container is also an outer section that surrounds the interior lower container. In this version, the lower container includes a floor 135, which is preferably integrally formed with the lower container.

Figure 14:
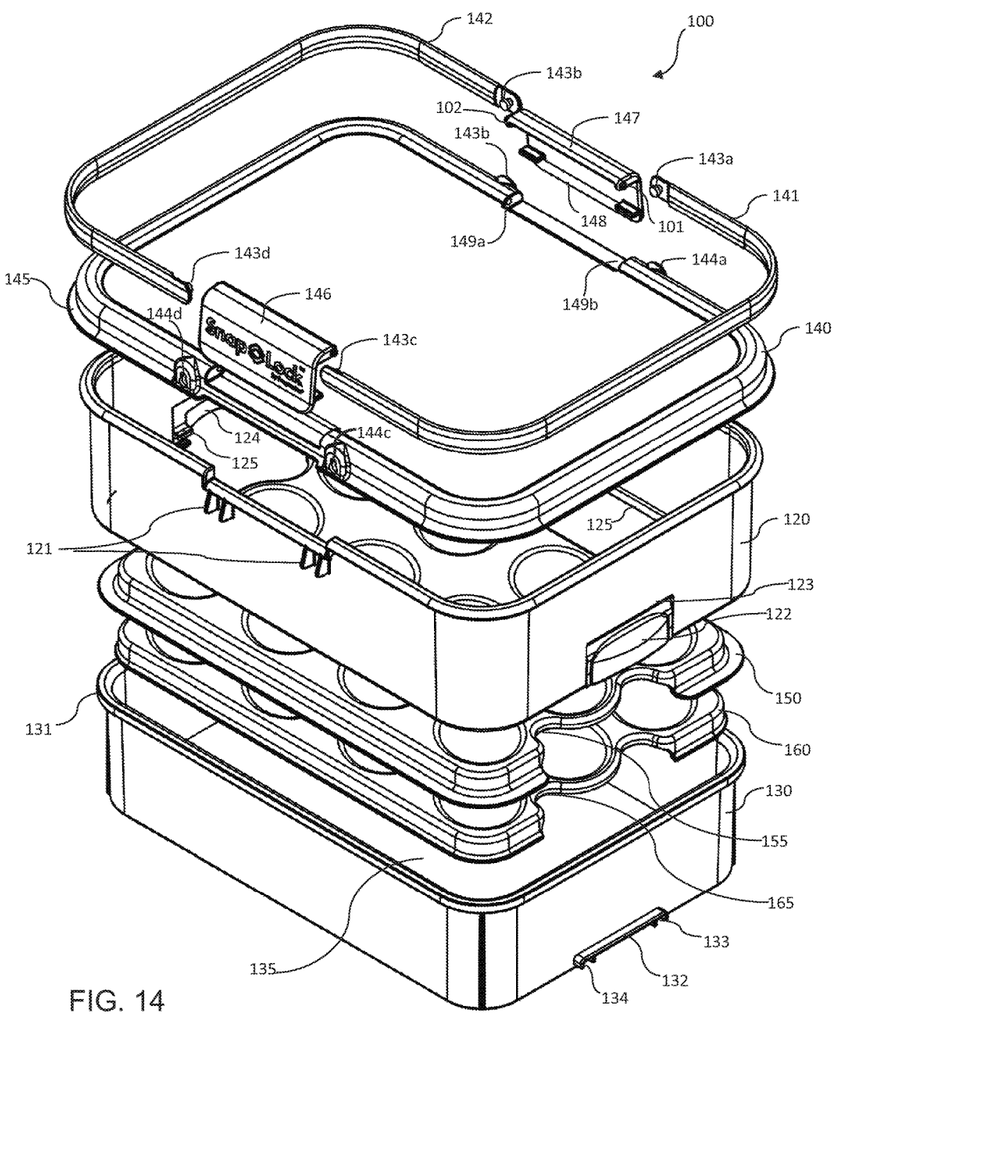
FIG. 14 is a top perspective exploded view of a collapsible food carrier, configured for use in carrying deviled eggs or other food items.

In one example, the lid 140 includes one or more handles 141, 142 pivotally connected to the lid via a number of bosses 143a, 143b, 143c, 143d extending inwardly and joined to receptacles 144a, 144b, 144c, 144d formed in the outer periphery of the lid. The handles are configured to lie flat in a stowed position in which they are seated against a ledge 145 formed in the lid, or to rotate upward and toward one another in an extended position. As desired by a user, the handles may be rotated upward and together, so that a user may grasp both handles together in one hand for carrying.

The lid preferably includes a pair of lid latches 146, 147, each pivotally connected to the lid. For example, a first lid latch 147 is joined to the lid at pivotal connection points 149a, 149b formed in a cutout or recessed portion of the lid. In one version, each latch includes a pair of opposing pegs (e.g. 101, 102) which are configured to be received in mating cavities (e.g. 149a, 149b) formed in the lid. Accordingly, each lid latch is pivotally connected to the lid. The lid latches further include a lower shoulder, e.g. 148, positioned on the lid latch to engage a latching surface, e.g. 121, formed on an outer surface of the upper container. In one version the latching surface is formed as a series of vertical ribs having lower horizontal surfaces that terminate in an outer tooth. The lower shoulder 148 preferably also includes an upwardly-directed tooth so that the teeth interact with one another and require an exertion of a force to cause the materials to deflect or deform in order to latch and unlatch the lid latch.

The outer container 120 includes a pair of container latches 122, 124, each preferably integrally formed with the outer container at a living hinge, e.g. 123. The container latches include lower locking features, e.g. 125, which in one version comprises a pair of flanges 125a, 125b spaced apart by a channel to receive a portion of a bar 132 positioned at a lower outer portion of the lower container. In one version, the bar 132 includes a pair of outer ribs 133, 134 sized and arranged to fit within the channel between the flanges when a container latch is pivoted to a locked position.

The lower container includes an upper rim 131 that extends radially outward, and which is configured to fit within the interior sidewalls of the upper container 120. The upper container likewise includes a lower inwardly-directed rim 125 at its otherwise open bottom. The upper rim 131 of the lower container and the lower rim 125 of the upper container are sized so that they will abut one another in an expanded position to prevent further upward travel of the upper container with respect to the lower container, holding the two container portions against one another and together.

In the preferred version, a pair of egg trays 150, 160 are provided, one of which is configured as an upper tray 150 and the other of which is configured as a lower tray 160. In one version, the lower tray includes an inward cutout 165 at one or both ends, and the upper tray includes a similar inward cutout 155, each of which is arranged to allow a user to insert a finger between the tray and the container to aid in removing the tray from the container.

Figure 15:
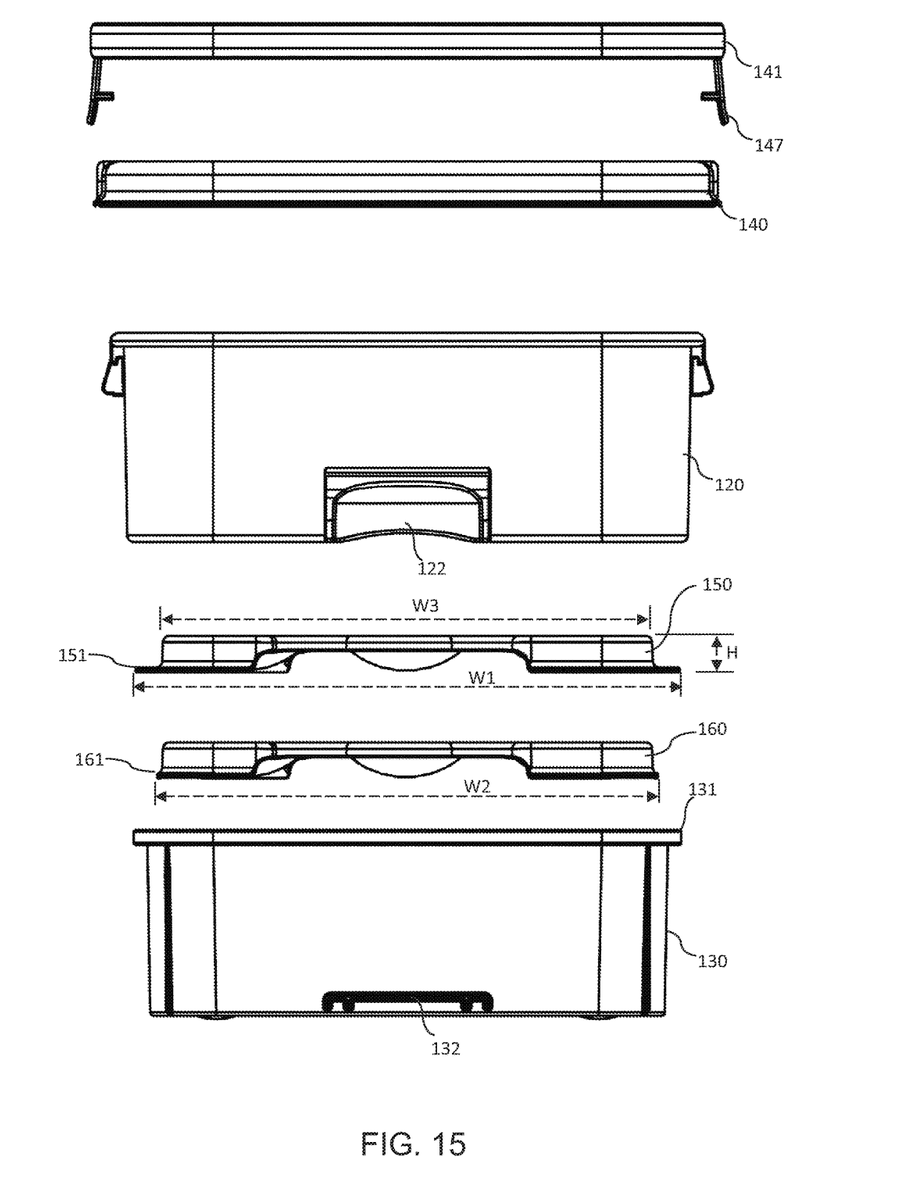
FIG. 15 is an exploded side elevational view of the carrier of FIG. 14.

With reference to side elevational view of FIG. 15, the egg trays are formed with different widths. The upper tray 150 has a peripheral flange 151 having a flange width W1 from one side to the other of the peripheral flange. The egg trays are positioned to extend above the flange 151 to a height H (in the orientation of FIG. 15), and extend from one side to the other for a tray width W3. Similarly, as seen in the front elevational view of FIG. 16, the upper tray has a flange length L1 and a tray length L3. With further reference to the sectional view of FIG. 18 (shown without an upper tray in position, to aid in clarity of illustration), the lower container 130 includes an interior sidewall length L4 while the upper container 120 which surrounds the lower container includes an interior sidewall length L5. The upper tray is configured so that the tray width L3 is less than or nearly equal to the lower container sidewall length L4. The upper tray flange length L1 is greater than the lower container sidewall length L4 but less than the upper container sidewall length L5. With this arrangement, the upper tray can fit within the upper container and the flange 151 can rest atop the upper rim 131 of the lower container. The container and tray widths are preferably formed with these same relationships.

Figure 18:
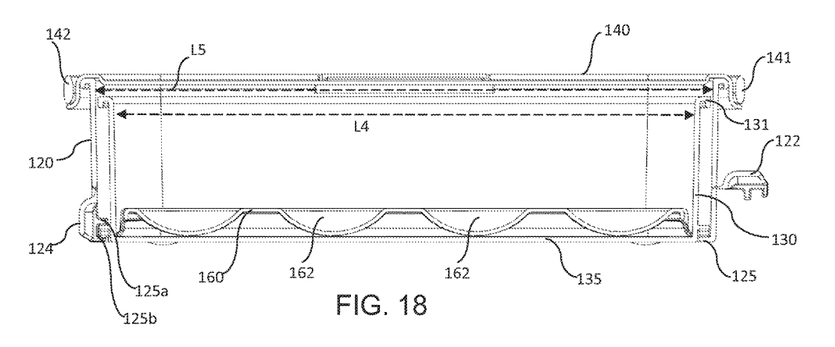
FIG. 18 is a front sectional view of the carrier FIG. 14, as viewed in the direction of line 18-18 in FIG. 17.

The lower tray has an overall length L2 that is less than or nearly equal to the interior lower container sidewall length L4 (and has a width with this same relationship) so that the lower tray can fit within the lower container and rest on the floor 135, as best seen in FIG. 18.

Figure 16:
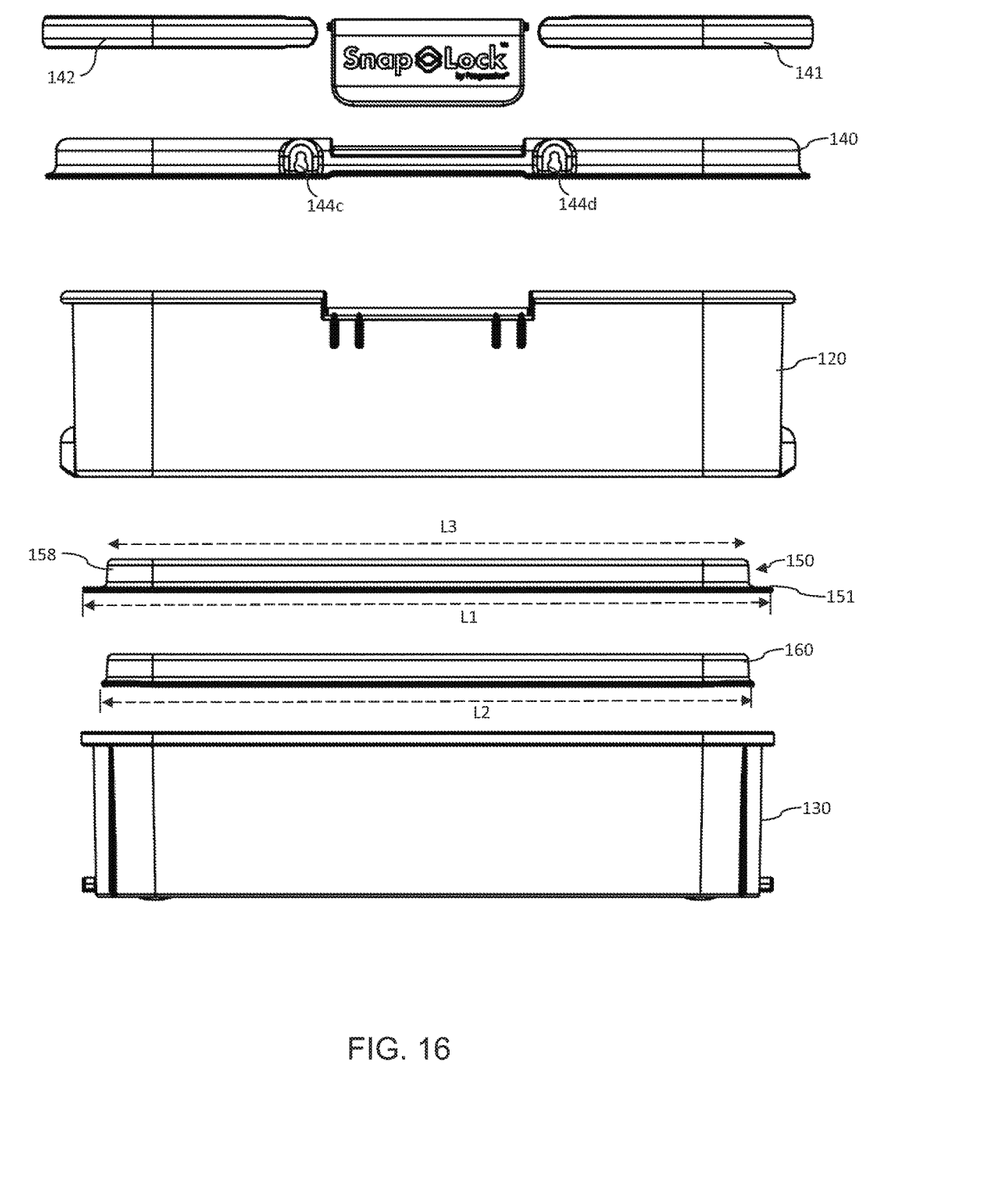
FIG. 16 is an exploded front view of the carrier of FIG. 14.
Figure 17:
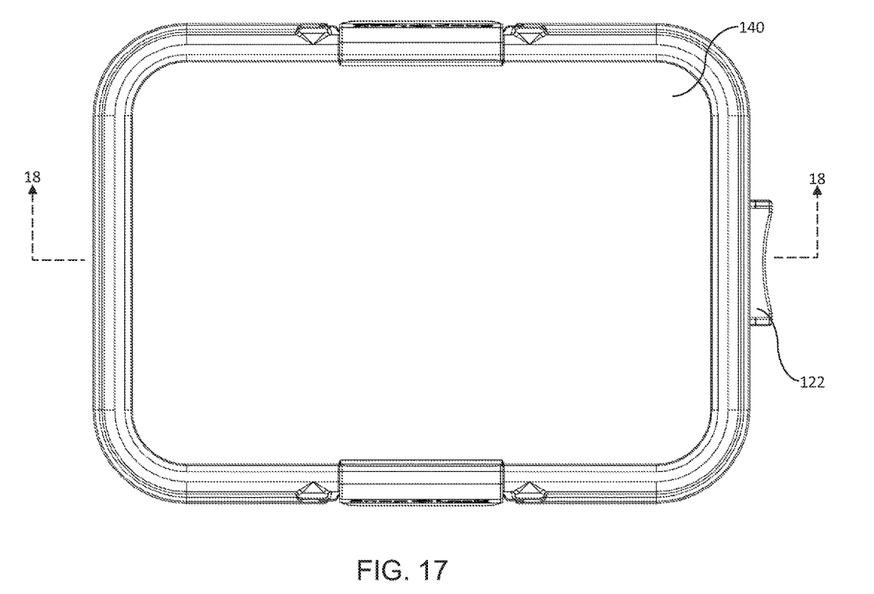
FIG. 17 is a top plan view of the carrier of FIG. 14.

Each of the upper and lower trays includes a number of concavities, e.g. 162, for receiving and holding an egg. In the case of the upper tray 150, the concavities are contained within the tray portion 158 which extends above the flange 151, as best seen in FIG. 16. In use, the upper tray is positioned atop the upper rim 131 of the lower container when oriented as shown in FIG. 16, with the tray portion 158 extending upward from the flange. In a storage position, the upper tray is inverted so that the tray portion extends below the flange, thereby allowing a more compact storage size. As indicated in the sectional view of FIG. 18, there is preferably a limited space between the upper rim 131 and the lid 140 when the container is collapsed in the position as shown, most preferably extending a distance which is less than the height H of the tray, and which is sufficient to accommodate the flange 151 between the upper rim and the lid when the upper tray is in the inverted storage position, but which otherwise would not fit if the upper tray were in the position oriented for use, with the concavities facing upward. Accordingly, the orientation provides for a more compact storage of the container and trays within the container.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A collapsible food keeper, comprising:
    a lower container having a base surrounded by upwardly extending lower container sidewalls terminating in an open rim to define an interior space, the open rim extending outwardly from the upwardly extending lower container sidewalls
    an upper container having upwardly extending upper container sidewalls, an open top, and an open bottom, the open bottom having an inwardly-directed flange;
    the upper container further including at least one container latch hingedly attached to the upper container and configured to releasably engage a locking feature positioned on an outer surface of the lower container, wherein the upper container is moveable between a collapsed position in which the upper container surrounds the lower container and the at least one container latch is engaged with the locking feature, and an expanded position in which the at least one container latch is disengaged and the upper container is raised with respect to the lower container and the at least one container latch is engaged with the open rim of the lower container;
    a lid removably attachable to the open top of the upper container to enclose an upper portion of the upper container, wherein when the collapsible food keeper is in the collapsed position a first height is defined between the lid and the open rim of the lower container;
    a lower tray configured to hold a food item; and
    an upper tray configured to hold a food item, the upper tray being supportable by the collapsible food keeper in a position above the lower tray.

2. The collapsible food keeper of claim 1, wherein the at least one container latch comprises a first container latch joined to the upper container via a first living hinge, and a second container latch joined to the upper container via a second living hinge.

3. The collapsible food keeper of claim 2, wherein the locking feature comprises a first bar on the outer surface of the lower container and a second bar on the outer surface of the lower container.

4. The collapsible food keeper of claim 3, wherein:
    the upper tray further includes a tray flange having a tray flange length;
    the lower container includes a lower tray interior sidewall length; and
    the upper container includes an upper tray interior sidewall length;
    the tray flange length being greater than the lower tray interior sidewall length and less than the upper tray interior sidewall length, whereby the tray flange is supportable by the open rim of the lower tray.

5. The collapsible food keeper of claim 4, wherein the upper tray includes a tray portion, the tray flange extending peripherally beyond the tray portion, the tray portion further having a tray portion height, the tray portion height being greater than the first height.

6. The collapsible food keeper of claim 5, wherein the upper tray comprises a plurality of concavities configured for holding eggs.

7. The collapsible food keeper of claim 6, wherein the upper tray portion extends above the tray flange when the upper tray is supported by the lower container and the collapsible food keeper is in the expanded position, and further wherein when the collapsible food keeper is in the collapsed position the upper tray is inverted whereby the upper tray portion extends below the tray flange.

8. The collapsible food keeper of claim 7, wherein the lower tray is sized to rest on the base of the lower container.

9. The collapsible food keeper of claim 7, wherein the plurality of concavities are facing downward when the upper tray is inverted.

10. The collapsible food keeper of claim 5, wherein the lid further comprises a pair of handles pivotally attached to the lid.

11. The collapsible food keeper of claim 10, wherein the lid further comprises a peripheral ledge arranged to support the pair of handles.

12. A collapsible food keeper, comprising:
   a lower container having a base surrounded by upwardly extending lower container sidewalls terminating in an open rim to define an interior space, the lower container having a support surface extending outwardly from the upwardly extending lower container sidewalls;
   an upper container having upwardly extending upper container sidewalls, an open top, and an open bottom, the open bottom having an inwardly-directed flange configured to engage the support surface;
   the upper container further including at least a pair of container latches attached to the upper container and configured to releasably engage a corresponding abutment positioned on an outer surface of the lower container, wherein the upper container is moveable between a collapsed position in which the upper container surrounds the lower container and each of the pair of the pair of container latches is engaged with the corresponding abutment, and an expanded position in which the upper container is raised with respect to the lower container and each of the container latches is engaged with the support surface of the lower container;
   a lid removably attachable to the upper container to enclose an upper portion of the upper container, wherein when the collapsible food keeper is in the collapsed position a first height is defined between the lid and the open rim of the lower container; and
   an upper tray configured to hold a food item, the upper tray being supportable by an upper portion of the lower container when the lid is attached to the upper container, whereby the upper tray is suspended above the base of the lower container.

13. The collapsible food keeper of claim 12, wherein the pair of container latches are attached to the upper container by a pair of living hinges.

14. The collapsible food keeper of claim 12, wherein the support surface comprises a pair of bars on the outer surface of the lower container.

15. The collapsible food keeper of claim 12, further comprising a lower tray configured to hold a food item;
   the upper tray further having a tray flange having a tray flange length;
   the lower container having a lower tray interior sidewall length; and
   the upper container having an upper tray interior sidewall length;
   the tray flange length being greater than the lower tray interior sidewall length and less than the upper tray interior sidewall length, whereby the tray flange is supportable by the open rim of the lower tray.

16. The collapsible food keeper of claim 12, wherein the upper tray includes a tray portion, the tray flange extending peripherally beyond the tray portion, the tray portion further having a tray portion height, the tray portion height being greater than the first height.

17. The collapsible food keeper of claim 16, wherein the upper tray portion comprises a plurality of concavities configured for holding eggs.

18. The collapsible food keeper of claim 17, wherein the lid further comprises a pair of handles pivotally attached to the lid.

19. The collapsible food keeper of claim 18, wherein the lid further comprises a peripheral ledge arranged to support the pair of handles.

* * * * *